US008935618B2

(12) United States Patent
Zhang et al.

(10) Patent No.: US 8,935,618 B2
(45) Date of Patent: Jan. 13, 2015

(54) METHOD AND SYSTEM FOR DISPLAYING MICRO-BLOG MESSAGE, MICRO-BLOG TERMINAL, AND SERVER, AND STORAGE MEDIUM

(75) Inventors: Li Zhang, Shenzhen (CN); Jingjing Li, Shenzhen (CN); Heng Wang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/115,265

(22) PCT Filed: Mar. 26, 2012

(86) PCT No.: PCT/CN2012/073035
§ 371 (c)(1),
(2), (4) Date: Nov. 1, 2013

(87) PCT Pub. No.: WO2012/149845
PCT Pub. Date: Nov. 8, 2012

(65) Prior Publication Data
US 2014/0068465 A1 Mar. 6, 2014

(30) Foreign Application Priority Data
May 5, 2011 (CN) .......................... 2011 1 0114892

(51) Int. Cl.
*G06F 3/00* (2006.01)
*G06F 17/30* (2006.01)
*H04L 12/58* (2006.01)
(52) U.S. Cl.
CPC ........ *G06F 17/30905* (2013.01); *H04L 12/588* (2013.01); *G06F 17/30864* (2013.01); *G06F 17/30321* (2013.01); *H04L 12/586* (2013.01)
USPC ...................................................... 715/753

(58) Field of Classification Search
None
See application file for complete search history.

(56) References Cited

U.S. PATENT DOCUMENTS

2008/0040370 A1 2/2008 Bosworth et al.
2011/0055723 A1* 3/2011 Lightstone et al. ........... 715/752
(Continued)

FOREIGN PATENT DOCUMENTS

CN 101090346 A 12/2007
CN 101374148 A 2/2009
(Continued)

OTHER PUBLICATIONS

State Intellectual Property Office of the P. R. China, "International Search Report", China, Jul. 5, 2012.
(Continued)

*Primary Examiner* — William Bashore
*Assistant Examiner* — Rayeez Chowdhury
(74) *Attorney, Agent, or Firm* — Tim Tingkang Xia, Esq.; Morris, Manning & Martin, LLP

(57) ABSTRACT

The disclosure relates to a method for displaying micro-blog messages, which includes: when the users look up the list roster, the micro-blog terminal sends an obtaining request to the micro-blog server, receives and display the list roster fed back by the micro-blog server; when any one of the micro-blog list is selected from the list roster, the micro-blog terminal writes a name of the chosen micro-blog list into a new displaying page, and sending a message list request to the micro-blog server; the micro-blog terminal receives the message list of the chosen micro-blog list that is fed back from the micro-blog server, and displaying the message list of the chosen micro-blog list on the new message displaying page. It is disclosed a system for displaying micro-blog messages, a micro-blog terminal, server, and storage medium thereof.

16 Claims, 8 Drawing Sheets

(56) References Cited

U.S. PATENT DOCUMENTS

| | | | | |
|---|---|---|---|---|
| 2011/0087604 A1* | 4/2011 | Chung et al. | .................. | 705/301 |
| 2011/0295964 A1* | 12/2011 | Hodgins | ....................... | 709/206 |
| 2012/0011239 A1* | 1/2012 | Svane et al. | .................. | 709/223 |
| 2012/0072835 A1* | 3/2012 | Gross et al. | .................... | 715/243 |
| 2012/0203855 A1* | 8/2012 | Hodgins | ....................... | 709/206 |

FOREIGN PATENT DOCUMENTS

| | | |
|---|---|---|
| CN | 101517529 A | 8/2009 |
| CN | 101681346 A | 3/2010 |
| JP | 2009506401 A | 2/2009 |
| WO | 2004114140 A1 | 12/2004 |
| WO | 2009111152 A2 | 9/2009 |
| WO | 2010/101851 A1 | 9/2010 |

OTHER PUBLICATIONS

State Intellectual Property Office of the People's Republic of China (ISA/CN), "Written Opinion of the International Searching Authority", China, Jul. 5, 2012.

The International Bureau of WIPO, "International Preliminary Report on Patentability", Switzerland, Nov. 5, 2013.

* cited by examiner

METHOD AND SYSTEM FOR DISPLAYING MICRO-BLOG MESSAGE, MICRO-BLOG TERMINAL, AND SERVER, AND STORAGE MEDIUM

FIELD OF THE INVENTION

The present disclosure relates generally to the field of micro-blog technology, and more particularly, to a method and system for displaying micro-blog message, micro-blog terminal and server, and storage medium thereof.

BACKGROUND OF THE INVENTION

Micro-blog is a system with a similarity to weblog system that allows messages to be posted instantly. Micro-blog is featured with its integrity and openness, which allows users to post messages thereon through mobile phones, instant messaging (IM) software, or external API (Application Programming Interface), etc. Along with the expanding of the application of IM software, posting micro-blog messages through IM is becoming an increasingly favorable way for users. Accordingly, the application of the micro-blog blossomed greatly as a new product which could expand the message dissemination mechanism of the IM.

Micro-blog list is an important application for the micro-blog system. Micro-blog list is a platform that allows a limited scope of focusing, linking, and communication for micro-blog users that have the same favorite or tags. When a user sets up a micro-blog list or is added into a micro-blog list, he or she could initiate conversation with multiple users within the right micro-blog list. Users may selectively follow other users or micro-blog lists that they are interested in, for building up a wide scope of relationship chain, as well as for quickly see messages posted by the users followed or included in the followed micro-blog lists. The messages posted by the users that are followed or included in the followed micro-blog lists are ranked by the timeline, the ranked message list is the homepage message list (or homepage message timeline), which stands for the most significance in the micro-blog application. Due to the discretion of the relationship chain in micro-blog, as a user follows large amount of users, the homepage message list would become disordered that critical message from particular users would be missed. For instance, when a followed user is relatively active, the homepage message list would be occupied by this followed user while other followed users' messages would be missed. A problem and demand arise along with the development of the micro-blog technology in effectively organizing the homepage message list, thereby increasing the efficiency in the usage of the homepage.

SUMMARY OF THE INVENTION

The embodiment of the present disclosure is providing a method for displaying micro-blog message, a micro-blog terminal and server, which could effectively organize and display the micro-blog main page messages, whereby enabling users to check the concerning micro-blog messages in an efficient way, while improving the users' using efficiency of the micro-blog main page.

It is thereby provided by the present disclosure a method for displaying micro-blog messages, which includes:

when detected a user's lookup operation on a micro-blog list, a micro-blog terminal corresponding to the user sending an obtaining request to a micro-blog server for obtaining a list roster of the user;

the micro-blog terminal receiving and displaying the list roster of the user that is fed back by the micro-blog server; the list roster including at least one micro-blog list;

when any one of the micro-blog list is selected from the list roster, the micro-blog terminal writing a name of the chosen micro-blog list into a new displaying page, and sending a message list request to the micro-blog server for obtaining the message list of the chosen micro-blog list; and the micro-blog terminal receiving the message list of the chosen micro-blog list that is fed back from the micro-blog server, and displaying the message list of the chosen micro-blog list on the new message displaying page with the name of the chosen micro-blog list.

Wherein, when detected the user's lookup operation on the micro-blog list, the micro-blog terminal corresponding to the user sending an obtaining request to the micro-blog server for obtaining the list roster of the user, includes:

when detected the user's lookup operation on the micro-blog list, the micro-blog terminal corresponding to the user packaging the user's ID, and accordingly generating the obtaining request;

the micro-blog terminal sending the obtaining request to the micro-blog server, for obtaining the list roster of the user.

Wherein, after the micro-blog terminal sending the obtaining request to the micro-blog server, and before the micro-blog terminal receiving and displaying the list roster of the user that is fed back by the micro-blog server, further includes:

the micro-blog server looking up the micro-blog list IDs of the micro-blog lists that the user joins or creates from a database according to the user ID included in the obtaining request from the micro-blog terminal, and generating a micro-blog list ID roster accordingly, which micro-blog list ID roster includes at least one micro-blog list;

the micro-blog server obtaining from a database the general information of the micro-blog lists corresponding to each micro-blog list ID according to the user's micro-blog list ID roster;

the micro-blog server feeding back to the micro-blog terminal the user's micro-blog list ID roster and the general information of the micro-blog lists corresponding to each micro-blog list ID; wherein the general information of the micro-blog list includes: micro-blog list ID and its member ID list, name of the micro-blog list, brief introduction of the micro-blog list, type of the micro-blog list, and one or more of the attributes of the micro-blog list.

Wherein, the micro-blog terminal receiving and displaying the list roster of the user that is fed back by the micro-blog server includes:

the micro-blog terminal receiving from the micro-blog server the user's micro-blog list ID roster and the general information of the micro-blog lists corresponding to each micro-blog list ID the micro-blog terminal generating the user's list roster which includes at least one micro-blog list according to the user's micro-blog list ID roster and the general information of the micro-blog list corresponding to each micro-blog list ID that are fed back from the micro-blog list server;

the micro-blog terminal displaying the user's list roster in the displaying interface.

Wherein, the micro-blog terminal sending a message list request to the micro-blog server for obtaining the message list of the chosen micro-blog list includes:

the micro-blog terminal packaging the chosen micro-blog list IDs to generate a message list request;

the micro-blog terminal sending the message list request to the micro-blog server for requesting to obtain the message list of the chosen micro-blog list.

Wherein, after the micro-blog terminal sending a message list request to the micro-blog server, and before the micro-blog terminal receiving the message list of the chosen micro-blog list that is fed back from the micro-blog server, further includes:

the micro-blog server looking up from a database the member ID list according to the chosen micro-blog list ID included in the message list request;

the micro-blog server obtaining the message indexing ID list of the members in the chosen micro-blog list according to the looked up member ID list of the chosen micro-blog list;

the micro-blog server iterating the message indexing ID list of the members of the chosen micro-blog list, ranking all the message indexing IDs in light of the timeline, to generate a messaging indexing ID list of the chosen micro-blog list;

the micro-blog server feeding back the messaging indexing ID list of the chosen micro-blog list to the micro-blog terminal;

the micro-blog terminal packaging the message indexing ID list of the chosen micro-blog list that is fed back from the micro-blog server, to generate a message body obtaining request to be sent to the micro-blog server for obtaining the message body corresponding to the message indexing ID list of the chosen micro-blog list;

the micro-blog server drawing the message bodies corresponding to the message indexing IDs in the messaging indexing ID list of the chosen micro-blog list according to the message indexing ID list of the chosen micro-blog list contained in the message body obtaining request sent from the micro-blog terminal; and feeding back the message bodies corresponding to the message indexing IDs in the message indexing ID list to the micro-blog terminal.

Wherein, the micro-blog terminal receiving the message list of the chosen micro-blog list that is fed back from the micro-blog server, and displaying in the new message displaying page with the name of the chosen micro-blog list the message list of the chosen micro-blog list includes:

the micro-blog terminal receiving the message indexing ID list and message bodies corresponding to each message indexing ID in the message indexing ID list that are fed back from the micro-blog server;

the micro-blog terminal generating a message list for the chosen micro-blog list according to the message indexing ID list and message bodies corresponding to each message indexing ID in the message indexing ID list;

the micro-blog terminal displaying the message list of the chosen micro-blog list in the new message displaying page with the name of the chosen micro-blog list.

Wherein, after the micro-blog terminal receiving and displaying the list roster of the user that is fed back by the micro-blog server, further includes:

the micro-blog terminal timely sending an unread lookup request to the micro-blog server, for looking up the unread messages of each micro-blog list included in the list roster; which includes:

the micro-blog terminal packaging the micro-blog list ID roster of the user's micro-blog list roster, and generating an unread lookup request;

the micro-blog terminal sending the unread lookup request to the micro-blog server for looking up the unread messages of each micro-blog list included in the list roster.

Wherein, after the micro-blog terminal sending the unread lookup request to the micro-blog server, further includes:

the micro-blog server determining whether the members of the micro-blog list corresponding to the micro-blog list ID have posted new messages between the last unread lookup request and the current unread lookup request, according to the micro-blog list ID roster contained in the unread lookup request;

if there finds the new posted messages, the micro-blog server seting an unread sign on the micro-blog list ID of which the user that posted the new message is the member, and a micro-blog list ID roster with unread signs are sent back to the micro-blog terminal;

the micro-blog terminal iterating the ID lists with unread signs that are fed back from the micro-blog server, and displaying in the user's list roster the corresponding unread sign.

Correspondingly, it is provided by the current disclosure a micro-blog terminal, wherein the micro-blog terminal includes:

a micro-blog list management module for sending a list roster obtaining request to a micro-blog server when a query operation is detected indicating the user is querying for the micro-blog list roster, thereby requesting for obtaining the user's micro-blog list roster; receiving and displaying the user's micro-blog list roster as the micro-blog server feeds back, which micro-blog list roster including at least one micro-blog list; writing the name of the chosen micro-blog list into a new displaying page when any one of the micro-blog list is selected from the list roster; and sending a message list request to the micro-blog server for obtaining a message list of the chosen micro-blog list;

a micro-blog message management module for receiving the message list of the chosen micro-blog list that is fed back from the micro-blog server, and for displaying the message list of the chosen micro-blog list on the new message displaying page with the name of the chosen micro-blog list.

Wherein, the micro-blog list management module is further used for timely sending an unread lookup request to the micro-blog server for looking up the unread messages of each micro-blog list included in the list roster; receiving and iterating the ID lists with unread signs that are fed back from the micro-blog server; and displaying in the user's list roster the corresponding unread sign.

Correspondingly, it is further provided by the present disclosure a micro-blog server, wherein the micro-blog server includes:

a micro-blog user server for storing and managing general information of micro-blog users, which general information of the users including user ID, micro-blog list IDs of micro-blog lists that the user joins or creates; and for looking up the micro-blog list IDs of the micro-blog lists that the user joins or creates according to the user ID included in an obtaining request from a micro-blog terminal; and generating a micro-blog list ID roster accordingly;

a micro-blog list server for storing and managing general information of the micro-blog lists, which general information of the micro-blog lists including micro-blog list ID and its member ID list; and for obtaining the general information of the micro-blog lists corresponding to each micro-blog list ID according to the user's micro-blog list ID roster, feeding back to the micro-blog terminal the user's micro-blog list ID roster and the general information of the micro-blog lists corresponding to each micro-blog list ID; and for looking up the member ID lists of the chosen micro-blog list according to the chosen micro-blog list ID included in a message list request that is sent from the micro-blog terminal;

a micro-blog indexing server for managing message indexing, and managing a mapping relationship between message indexing ID and the user ID; and for obtaining the members' message indexing ID list of the chosen micro-blog list according to the member ID list of the chosen micro-blog list; iterating the members' message indexing ID list of the chosen micro-blog list; ranking all the message indexing ID in light of the timeline; generating the message indexing ID list of the chosen micro-blog list; and feeding back the message indexing ID list of the chosen micro-blog list to the micro-blog terminal;

a micro-blog message server for managing message bodies and a mapping relationship between the message indexing ID and the message body; providing the micro-blog terminal with message bodies corresponding to the message indexing ID list of the current message list; drawing the message bodies corresponding to the message indexing IDs in the messaging indexing ID list of the chosen micro-blog list according to the message indexing ID list of the chosen micro-blog list contained in the message body obtaining request sent from the micro-blog terminal; and feeding back the message bodies corresponding to the message indexing IDs in the message indexing ID list to the micro-blog terminal.

Wherein, the micro-blog list server is further used for determining whether the members of the micro-blog list corresponding to the micro-blog list ID have posted new messages between a last unread lookup request and a current unread lookup request, according to the micro-blog list ID roster contained in the unread lookup request sent from the micro-blog terminal; setting an unread sign on the micro-blog list ID of which the user that posted the new message is the member if there finds the new posted messages; and sending back a micro-blog list ID roster with unread signs to the micro-blog terminal.

It is still provided by the current disclosure a system for displaying micro-blog messages, wherein the system includes an above micro-blog terminal, and an above micro-blog server.

Further, the current disclosure is providing one or more non-transitory storage medium that includes executable program, which program being used for executing a method for displaying micro-blog messages, wherein the method includes:

when detected a user's lookup operation on a micro-blog list, a micro-blog terminal corresponding to the user sending an obtaining request to a micro-blog server for obtaining a list roster of the user;

the micro-blog terminal receiving and displaying the list roster of the user that is fed back by the micro-blog server; the list roster including at least one micro-blog list;

when any one of the micro-blog list is selected from the list roster, the micro-blog terminal writing a name of the chosen micro-blog list into a new displaying page, and sending a message list request to the micro-blog server for obtaining the message list of the chosen micro-blog list; and the micro-blog terminal receiving the message list of the chosen micro-blog list that is fed back from the micro-blog server, and displaying the message list of the chosen micro-blog list on the new message displaying page with the name of the chosen micro-blog list.

The current disclosure is beneficiary in the following.

1. The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

2. The current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

BRIEF DESCRIPTION OF THE DRAWINGS

For clear description of the embodiment or the conventional art, it is hereby briefly introduced necessary drawings for the description of the embodiments or the conventional art. It is clear that, the drawings in the below description would only relate to some of the embodiments of the present disclosure, for those skilled in the art, other drawing would be obtained according to the described drawings without inputting creative work.

FIG. 3 is a second illustrative diagram of the visual effect of the micro-blog message;

FIG. 4 is a third illustrative diagram of the visual effect of the micro-blog message;

FIG. 5 is a fourth illustrative diagram of the visual effect of the micro-blog message;

DESCRIPTION OF THE PREFERRED EMBODIMENTS

Clear and complete description of the technical solution of the embodiments of the current disclosure shall be made hereinafter with reference to the drawings. It is clear that the described embodiments are only part of the current disclosure instead of limiting the embodiments. Any embodiment that those skilled in the art could make without inputting creative spirit based on the embodiment herein would be defined as within the scope of the current disclosure.

Figure 1:
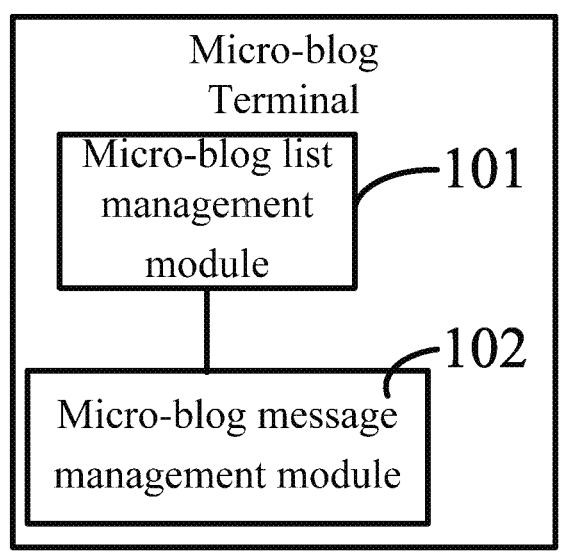
FIG. 1 is a structural diagram of the embodiment of the micro-blog terminal according to the current disclosure.

FIG. 1 is a structural diagram of the embodiment of the micro-blog terminal according to the current disclosure. The micro-blog terminal includes as follows.

A micro-blog list management module 101 is used for sending a list roster obtaining request to a micro-blog server when a query operation is detected indicating the user is querying for the micro-blog list roster, thereby requesting for obtaining the user's micro-blog list roster. The micro-blog list management module 101 is used for receiving and displaying the user's micro-blog list roster as the micro-blog server feeds back, which micro-blog list roster includes at least one micro-blog list. When the user chooses any one of the micro-blog list from the list roster, the name of the chosen micro-blog list is written into a new displaying page, and a message list request is sent to the micro-blog server for obtaining the message list of the chosen micro-blog list.

The user is authenticated through using the registered user account and password to log in the micro-blog server through an IM client of the micro-blog terminal. After the successful authentication, a connection channel is set up between the micro-blog terminal and the micro-blog server, whereby the micro-blog terminal is coupled to the micro-blog server through a coupling server. The micro-blog terminal maintains the connection with the micro-blog server through sending a timing heartbeat to the micro-blog server. Each user has his own list roster according to the micro-blog list that he creates or joins.

Figure 2:
FIG. 2 is a first illustrative diagram of the visual effect of the micro-blog message.
Figure 3:
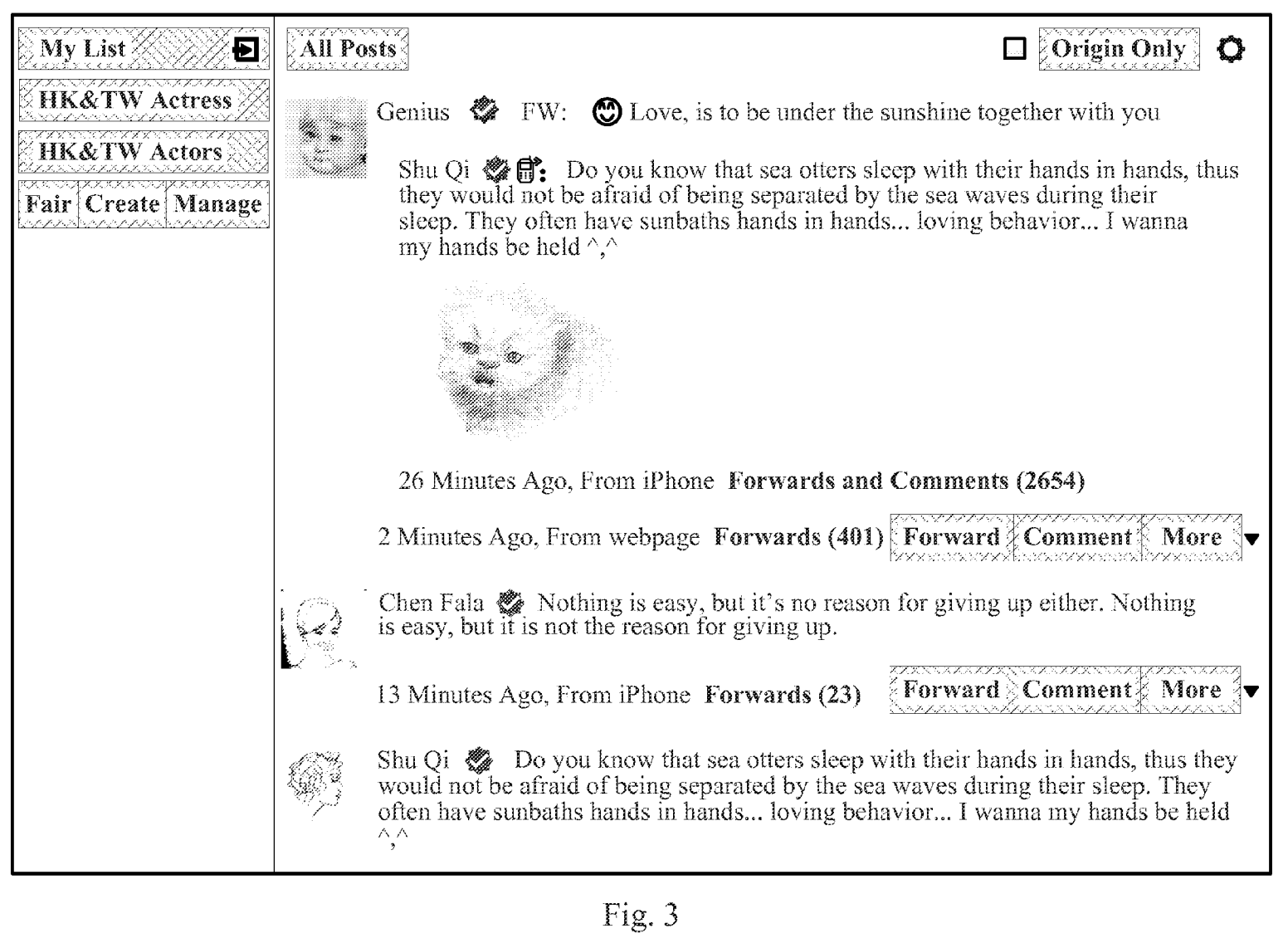

Referring also to FIG. 2, an illustrative diagram of the visual effect of the micro-blog message is provided. The micro-blog terminal provides the user a functional key named "My List". The functional key "My List" may be folded (as in FIG. 2). When the user clicks the functional key "My List" through a mouse, the micro-blog terminal would provide the user a pull-down menu, which includes the list roster where the user may be able to create a new list, or to manage (delete or edit) the lists that are included in the list roster. Referring also to FIG. 3, which is a second illustrative diagram of the visual effect of the micro-blog message, the micro-blog terminal provides the user a functional key named "My List". The functional key "My List" may be displayed in a floating mode (as in FIG. 3), wherein the functional key "My List" can be opened at the left region of the message display page. The user may, through clicking a mouse, to create a new list in the list roster displayed in "My list", or manage (delete or edit) the micro-blog list in the list roster.

The micro-blog list management module 101 generally manages the creation of the micro-blog list, the general information of the micro-blog list, and the message interface of the micro-blog lists. According to the current embodiment, the micro-blog terminal monitors the mouse operation of the user, when it is monitored that a user clicks the mouse for a lookup operation on the micro-blog list, the micro-blog list management module 101 sends an obtaining request to the micro-blog server for obtaining the list roster of the user. In detail, the micro-blog list management module 101 packages the user's ID, and accordingly generates the obtaining request to be sent to the micro-blog server, for obtaining the list roster of the user. After sending the obtaining request, the micro-blog list management module 101 receives and displays the list roster of the user that is fed back by the micro-blog server. The list roster includes at least one micro-blog list. It shall be understandable that, the micro-blog list management module 101 displays the list roster through a foldable mode or a floating mode.

Figure 4:
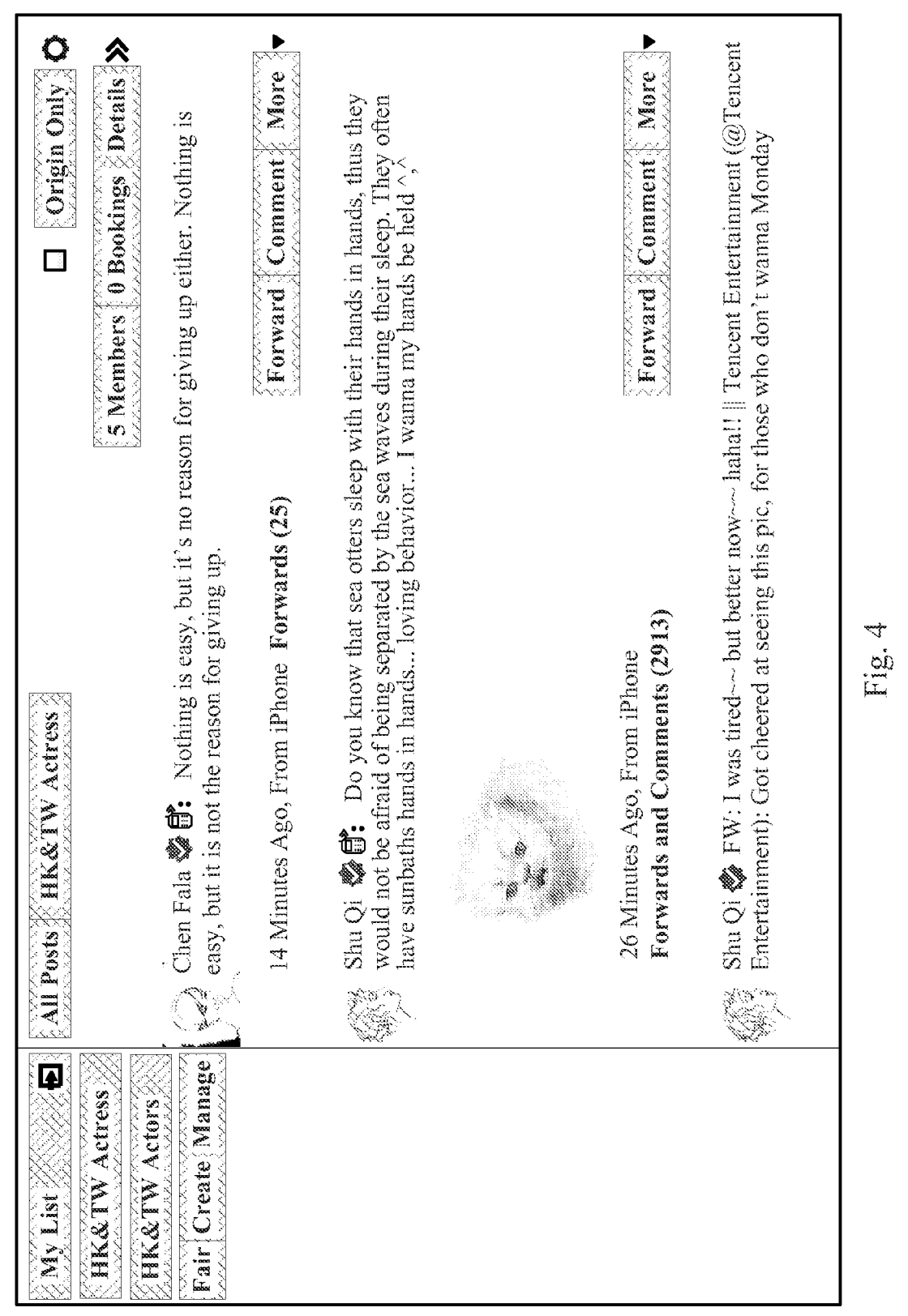

When the user choose any one of the micro-blog list in the list roster, with reference to FIG. 4 which is an illustrative diagram of a third visual effect of the micro-blog message, as the user chooses the micro-blog list named "Hong Kong and Taiwan Actress" from the list roster, the micro-blog list management module 101 would write the name of the micro-blog list "Hong Kong and Taiwan Actress" into a new message displaying page (as in FIG. 4), which new message displaying page is located in a latter page of the main message displaying page. The micro-blog list management module 101 packages the IDs of the "Hong Kong and Taiwan Actress" in the micro-blog list, to generate the obtaining request to be sent to the micro-blog server, to request for obtaining the message lists of the "Hong Kong and Taiwan Actress" in the chosen micro-blog list.

A micro-blog message management module 102 is used for receiving the message list of the chosen micro-blog list that is fed back from the micro-blog server, and for displaying in the new message displaying page with the name of the chosen micro-blog list the message list of the chosen micro-blog list.

The micro-blog message management module 102 manages the micro-blog messages of the user. In the current embodiment, after the micro-blog list management module 101 sends a message list request, the micro-blog message management module 102 receives the message list of the chosen micro-blog list that is fed back from the micro-blog server, and displays in the new message displaying page with the name of the chosen micro-blog list the message list of the chosen micro-blog list. In detail, the micro-blog message management module 102 receives a message indexing ID list and message bodies corresponding to each message indexing ID in the message indexing ID list that are fed back from the micro-blog server, and creates an Item control for each message of the chosen micro-blog list, to generate a message list; and sequentially display the message list of the chosen micro-blog list in the new message displaying page with the name of the chosen micro-blog list (with reference to FIG. 4 for details). It shall be mentioned that, the current embodiment picks up the message lists that the user is following in the micro-blog list from the main message displaying page, and sequentially displays in different pages, which facilitate the users in effective and quick check of the messages, and improves greatly the using efficiency of the micro-blog main page. It shall be understood that, the micro-blog message management module 102 is also used for managing the posting, deleting operations of the user to the micro-blog messages, which is similar to the art and would not be described herein.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

Figure 5:
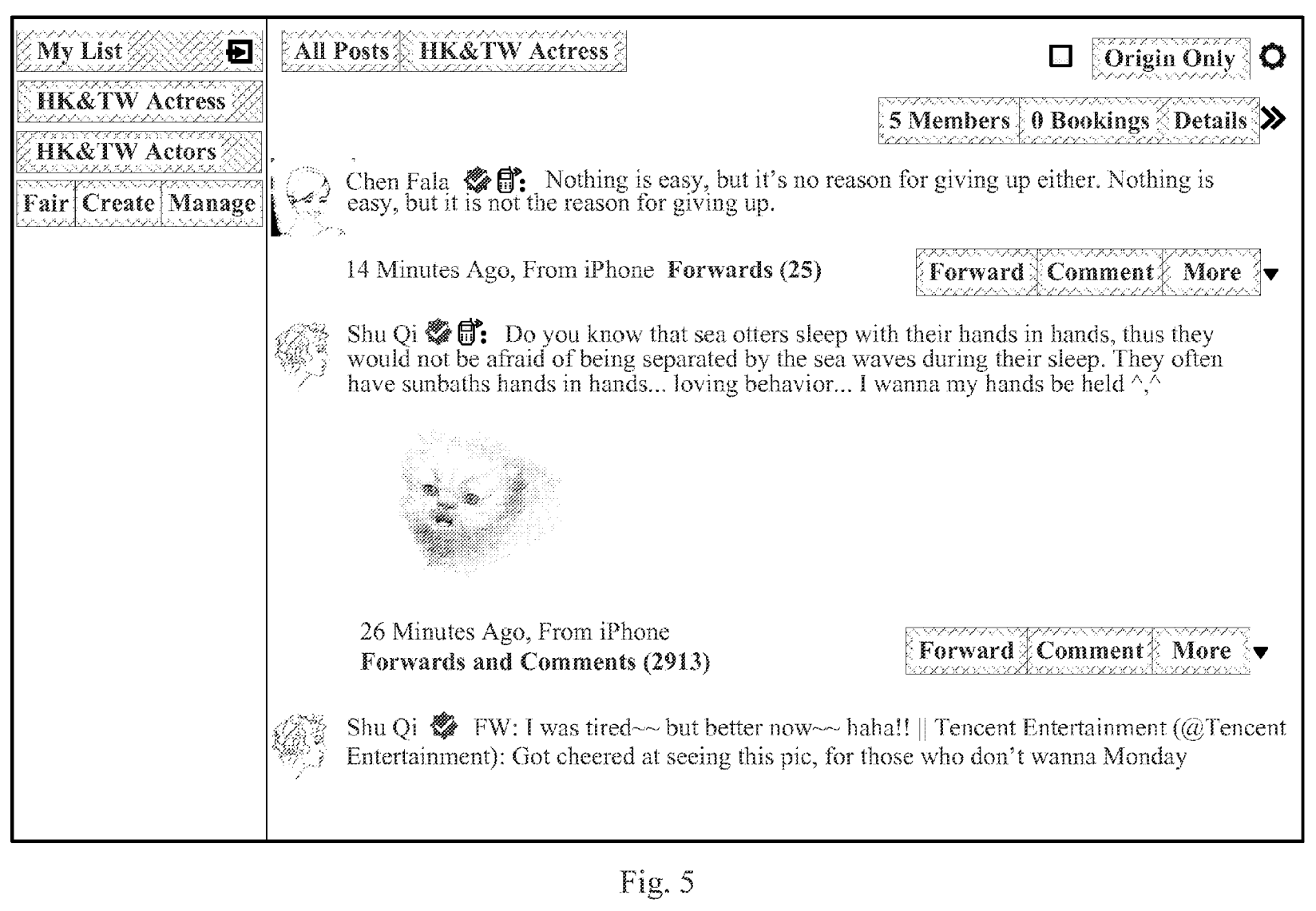

It is mentioned herein that, after the micro-blog list management module 101 displays the list roster for the user, the micro-blog list management module 101 further launches a timer to timely send an unread lookup request to the micro-blog server for looking up the unread messages of each micro-blog list included in the list roster. Meanwhile the micro-blog list management module 101 receives and iterates the ID lists with unread signs that are fed back from the micro-blog server, and displays in the user's list roster the corresponding unread sign. Referring to FIG. 5, an illustrative diagram of a fourth visual effect of the micro-blog message is provided. If the micro-blog list management module 101 finds an unread sign is set on the micro-blog list "Hong Kong and Taiwan Actor" after iterating the ID lists that are fed back from the micro-blog server, it is indicated that there are new messages being posted by the members of the micro-blog list "Hong Kong and Taiwan Actor" between the time of the last unread lookup request and the current unread lookup request. The micro-blog list management module may use a new font to re-draw the name of the "Hong Kong and Taiwan Actor" in the list roster, and display in the list roster using the new font (as in FIG. 5) for reminding the user to read the new message. It shall be understood that, the way that the micro-blog list management uses the new font for the display of the unread sign is only illustrative, other methods, such as adding a reminding frame next to the micro-blog list with unread sign in the list roster for reminding the user to read the new message shall be similarly provided and would not be described here. Besides, in the current embodiment, the time for the timer could be determined by applicable demands.

The current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

For a clear description of the current disclosure, it is hereby described the micro-blog server of the current disclosure.

Figure 6:
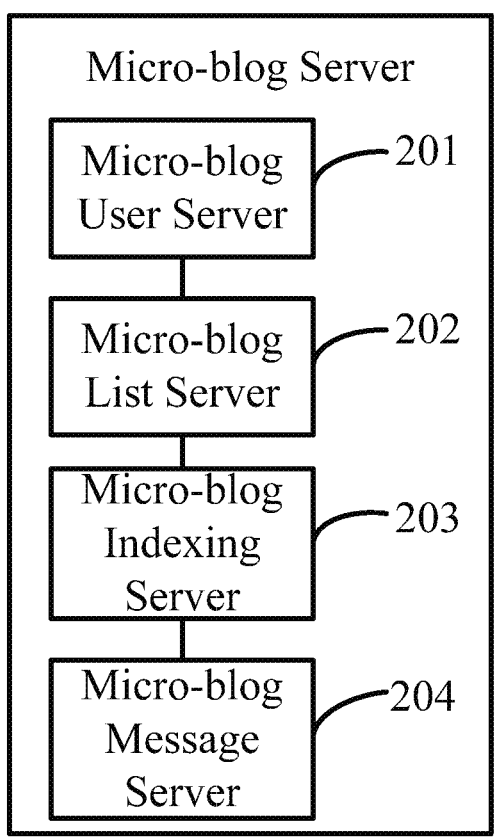
FIG. 6 is a structural diagram of a micro-blog server in accordance with an embodiment of the current disclosure.

Referring to FIG. 6, a structural diagram of a micro-blog server in accordance with an embodiment of the current disclosure includes as follows.

A micro-blog user server 201 is used for storing and managing the general information of the micro-blog users; and for looking up the micro-blog list IDs of the micro-blog lists that the user joins or creates from its own database according to the user ID included in the obtaining request from the micro-blog terminal, and generating a micro-blog list ID roster accordingly.

In practice, the general information of the micro-blog user includes but not limited to: the user ID, the micro-blog list IDs of the micro-blog lists that the user joins or creates, the user type, the user tag attribution, the authentication information, and any one or more of the user's follows. When received with the obtaining request from the micro-blog terminal for obtaining the user's list roster, the micro-blog user server 201 looks up the micro-blog list IDs of the micro-blog lists that the user joins or creates according to the user ID included in the obtaining request, and accordingly generate a micro-blog list ID roster.

A micro-blog list server 202 is used for storing and managing general information of the micro-blog lists; for obtaining the general information of the micro-blog lists corresponding to each micro-blog list ID according to the user's micro-blog list ID roster, and feeding back to the micro-blog terminal the user's micro-blog list ID roster and the general information of the micro-blog lists corresponding to each micro-blog list ID; and for looking up the member ID lists of the chosen micro-blog list according to the chosen micro-blog list ID included in a message list request that is sent from the micro-blog terminal.

The general information of the micro-blog list includes but not limited to: micro-blog list ID and its member ID list, name of the micro-blog list, brief introduction of the micro-blog list, type of the micro-blog list, and one or more of the attributes of the micro-blog list. The micro-blog list server 202 obtains from its own database the general information of the micro-blog list corresponding to the micro-blog list ID according to the micro-blog list ID roster that is generated by the micro-blog user server 201, and sends the user's micro-blog list ID roster and the general information of the micro-blog list corresponding to each micro-blog list ID to the micro-blog terminal. The micro-blog list management module 101 of the micro-blog terminal generate the user's list roster which includes at least one micro-blog list according to the user's micro-blog list ID roster and the general information of the micro-blog list corresponding to each micro-blog list ID that are fed back from the micro-blog list server 202, and displays the user's list roster in the displaying interface.

When receiving the message list request which is sent from the micro-blog list management module 101 of the micro-blog terminal, the micro-blog list server 202 looks up from its own database the member ID list according to the chosen micro-blog list ID included in the message list request.

A micro-blog indexing server 203 is used for managing the message indexing, and managing a mapping relationship between the message indexing ID and the user ID; and for obtaining the members' message indexing ID list of the chosen micro-blog list according to the member ID list of the chosen micro-blog list, iterating the members' message indexing ID list of the chosen micro-blog list, ranking all the message indexing ID in light of the timeline, generating the message indexing ID list of the chosen micro-blog list, and feeding back the message indexing ID list of the chosen micro-blog list to the micro-blog terminal.

In practice, the micro-blog indexing server 203 stores and manages the indexing of all the user posted messages, each indexing of the message being corresponding to an ID for identifying the indexing of the message. An indexing ID list is generated by ranking the message indexing ID in a time sequence. The micro-blog indexing server 203 is also used for storing and managing the mapping relationship between the message indexing ID and the user ID. The mapping relationship between the message indexing ID and the user ID is that, each message indexing ID is corresponding to a user ID, wherein such mapping relationship between the indexing ID and the user ID indicates that the message corresponding to the indexing ID is posted by the user corresponding to the user ID. The micro-blog indexing server 203 obtains from its own database the message indexing ID list of the members in the chosen micro-blog list according to the looked up member ID list of the chosen micro-blog list from the micro-blog list server 202. The micro-blog indexing server 203 iterates the message indexing ID list of the members of the chosen micro-blog list, ranks all the message indexing ID in light of the timeline, to generate a messaging indexing ID list of the chosen micro-blog list, and feeds back the messaging indexing ID list of the chosen micro-blog list to the micro-blog terminal, thereby enabling the micro-blog message management module 102 of the micro-blog terminal to pack the message indexing ID list of the chosen micro-blog list that is fed back from the micro-blog indexing server 203, to generate a message body obtaining request to be sent to the micro-blog server for obtaining the message body corresponding to the message indexing ID list of the chosen micro-blog list.

A micro-blog message server 204 is used for managing message bodies and the mapping relationship between the message indexing ID and the message body; providing the micro-blog terminal with message bodies corresponding to the message indexing ID list of the current message list; drawing the message bodies corresponding to the message indexing IDs in the messaging indexing ID list of the chosen micro-blog list according to the message indexing ID list of the chosen micro-blog list contained in the message body obtaining request sent from the micro-blog terminal; and feeding back the message bodies corresponding to the message indexing IDs in the message indexing ID list to the micro-blog terminal.

The micro-blog message server 204 stores and manages all the message bodies that all the users have posted, and manages the mapping relationship between the message indexing ID and the message bodies. The mapping relationship between the message indexing ID and the message bodies is that each message indexing ID is corresponding to one message body, wherein the mapping relationship between the message indexing ID and the message body indicates that the message corresponding to the message indexing ID includes the contents of the message body. A complete micro-blog message includes: the user ID (registered profile information such as registered name, UID) and message body (information like posted content, quoted content, location, tag of the message type, et al); wherein the user ID and the message body interconnects to each other through the message indexing ID. The micro-blog message server 204 draws the message bodies corresponding to the message indexing IDs in the messaging indexing ID list of the chosen micro-blog list according to the message indexing ID list of the chosen micro-blog list contained in the message body obtaining request sent from the micro-blog message management module 102 of the micro-blog terminal; and feeds back the message bodies corresponding to the message indexing IDs in the message indexing ID list to the micro-blog message management module 102 of the micro-blog terminal, thereby enabling the micro-blog message management module 102 to create the Item control for each message of the chosen micro-blog list, to generate a message list, and sequentially to display the message list of the chosen micro-blog list in the new message displaying page with the name of the chosen micro-blog list.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

It shall be mentioned that, when receiving the timely sent unread lookup request from the micro-blog list management module 101 of the micro-blog terminal, the micro-blog list server 202 determines whether the members of the micro-blog list corresponding to the micro-blog list ID have posted new messages between the last unread lookup request and the current unread lookup request, according to the micro-blog list ID roster contained in the unread lookup request. If there finds the new posted messages, an unread sign is set on the micro-blog list ID of which the user that posted the new message is the member, and a micro-blog list ID roster with unread signs are sent back to the micro-blog list management module 101 of the micro-blog terminal, thereby enabling the micro-blog list management module 101 of the micro-blog terminal to display the unread sign on the user's micro-blog list roster.

The current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

For clear description of the current disclosure, a detailed description of the method for displaying micro-blog messages is provided hereinafter.

Figure 7:
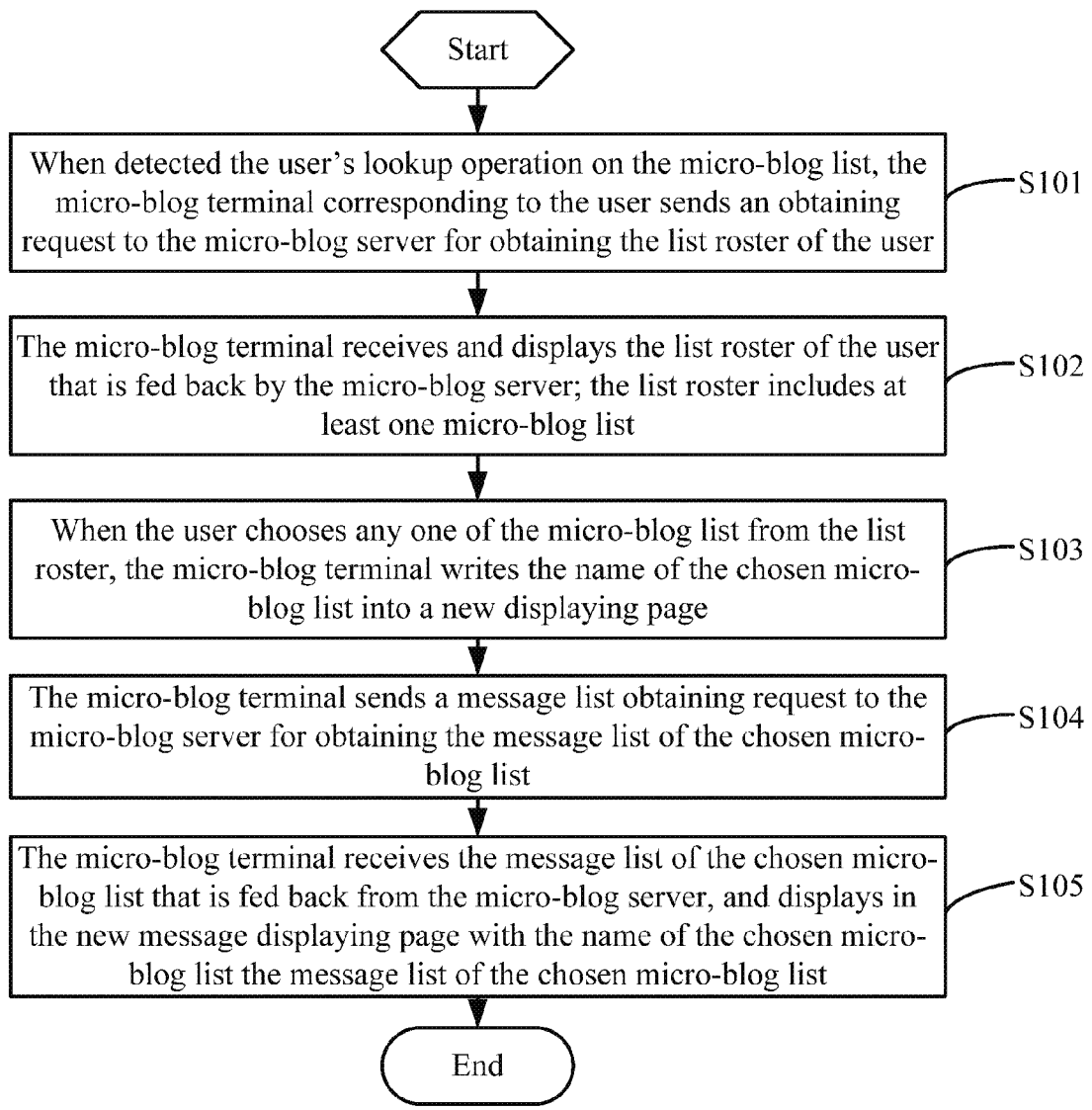
FIG. 7 is a flow diagram of the method for displaying micro-blog messages in accordance with a first embodiment.

Please refer to FIG. 7, which is a flow diagram of the method for displaying micro-blog messages in accordance with a first embodiment, which method includes as follows.

S101, when detected the user's lookup operation on the micro-blog list, the micro-blog terminal corresponding to the user sends an obtaining request to the micro-blog server for obtaining the list roster of the user.

The user is authenticated through using the registered user account and password to log in the micro-blog server through an IM client of the micro-blog terminal. After the successful authentication, a connection channel is set up between the micro-blog terminal and the micro-blog server, whereby the micro-blog terminal is coupled to the micro-blog server through a coupling server. The micro-blog terminal maintains the connection with the micro-blog server through sending a timing heartbeat to the micro-blog server. Each user has his own list roster according to the micro-blog list that he creates or joins. The micro-blog terminal provides the user a functional key named "My List". The functional key "My List" may be displayed in a foldable mode (as in FIG. 2) or a floating mode (as in FIG. 3), the user may click the displayed list roster in "My List" to create a new micro-blog list, as well as to manage (delete or edit) the micro-blog lists that are included in the list roster. The micro-blog terminal monitors the mouse operation of the user, when it is monitored that a user clicks the mouse for a lookup operation on the micro-blog list, the S101 sends an obtaining request to the micro-blog server for obtaining the list roster of the user. In detail, the S101 packages the user's ID, and accordingly generates the obtaining request to be sent to the micro-blog server, for obtaining the list roster of the user.

S102, the micro-blog terminal receives and displays the list roster of the user that is fed back by the micro-blog server; the list roster includes at least one micro-blog list.

After S101 sending the obtaining request, the S102 receives and displays the list roster of the user that is fed back by the micro-blog server. The list roster includes at least one micro-blog list. It shall be understandable that, the S102 displays the list roster through a foldable mode or a floating mode.

S103, when the user chooses any one of the micro-blog list from the list roster, the micro-blog terminal writes the name of the chosen micro-blog list into a new displaying page, and sends a message list request to the micro-blog server for obtaining the message list of the chosen micro-blog list.

When the user choose any one of the micro-blog list in the list roster, with reference to FIG. 4, as the user chooses the micro-blog list named "Hong Kong and Taiwan Actress" from the list roster, the S103 would write the name of the micro-blog list "Hong Kong and Taiwan Actress" into a new message displaying page (as in FIG. 4), which new message displaying page is located in a latter page of the main message displaying page. In practice, the S103 packages the IDs of the "Hong Kong and Taiwan Actress" in the micro-blog list, to generate the obtaining request to be sent to the micro-blog server, to request for obtaining the message lists of the "Hong Kong and Taiwan Actress" in the chosen micro-blog list.

S104, the micro-blog terminal receives the message list of the chosen micro-blog list that is fed back from the micro-blog server, and displays in the new message displaying page with the name of the chosen micro-blog list the message list of the chosen micro-blog list.

After the S103 sends a message list request, the S104 receives the message list of the chosen micro-blog list that is fed back from the micro-blog server, and displays in the new message displaying page with the name of the chosen micro-blog list the message list of the chosen micro-blog list. In detail, the S104 receives a message indexing ID list and message bodies corresponding to each message indexing ID in the message indexing ID list that are fed back from the micro-blog server, and creates an Item control for each message of the chosen micro-blog list, to generate a message list; and sequentially display the message list of the chosen micro-blog list in the new message displaying page with the name of the chosen micro-blog list (with reference to FIG. 4 for details). It shall be mentioned that, the current embodiment picks up the message lists that the user is following in the micro-blog list from the main message displaying page, and sequentially displays in different pages, which facilitate the users in effective and quick check of the messages, and improves greatly the using efficiency of the micro-blog main page.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

Figure 8:
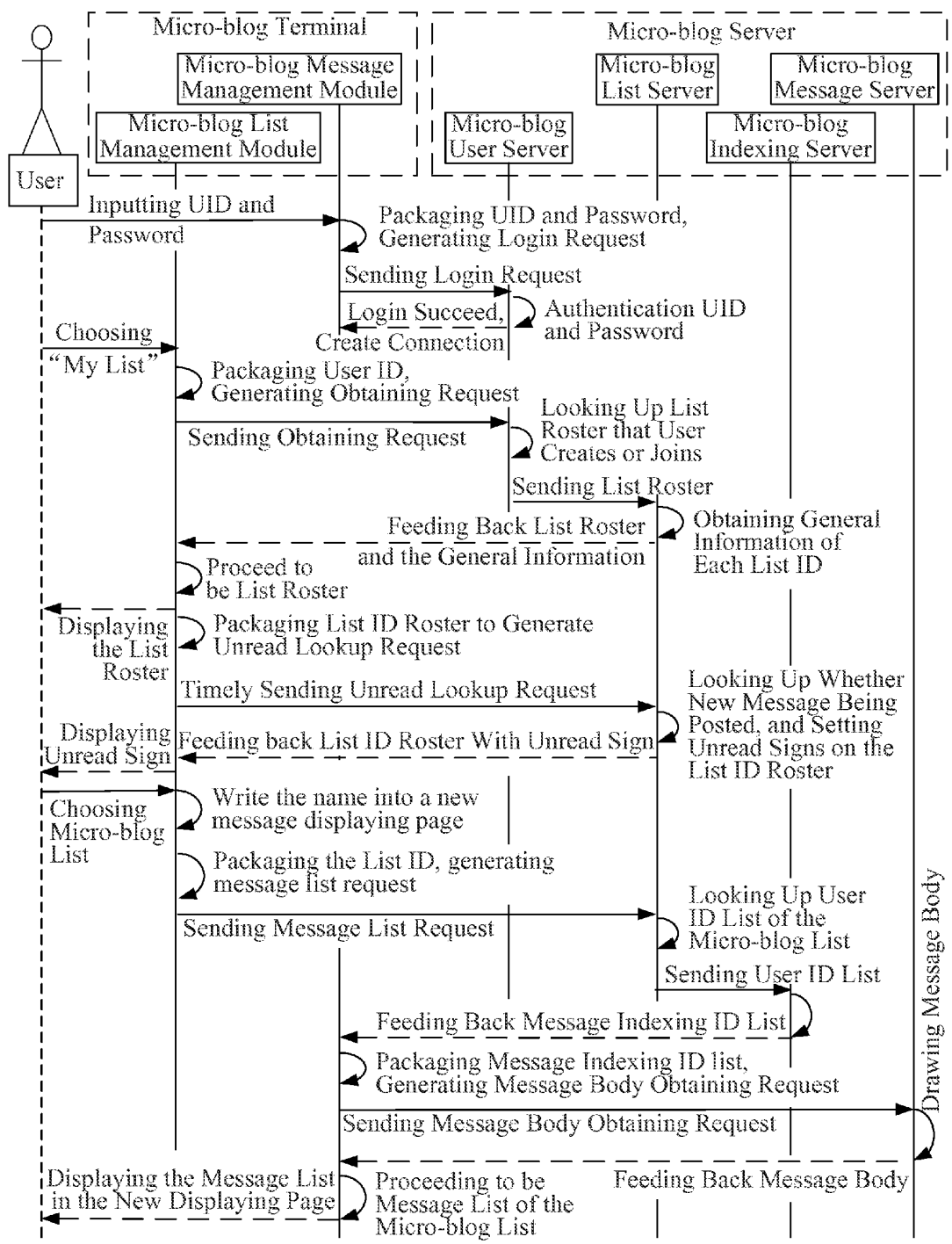
FIG. 8 is a flow diagram of the method for displaying micro-blog messages in accordance with a second embodiment.

Referring to FIG. 8, which is a flow diagram of the method for displaying micro-blog messages in accordance with a first embodiment. Which method includes as follows.

The user is authenticated through using the registered user account and password to log in the micro-blog server through an IM client of the micro-blog terminal. After the successful authentication, a connection channel is set up between the micro-blog terminal and the micro-blog server, whereby the micro-blog terminal is coupled to the micro-blog server through a coupling server. The micro-blog terminal maintains the connection with the micro-blog server through sending a timing heartbeat to the micro-blog server. The micro-blog terminal is used for displaying the message list of the micro-blog main page for the user.

When detected the user's lookup operation on the micro-blog list, the micro-blog list management module of the micro-blog terminal corresponding to the user packages the user's ID, and accordingly generates the obtaining request to be sent to the micro-blog server, for obtaining the list roster of the user. The micro-blog user server of the micro-blog server looks up the micro-blog list IDs of the micro-blog lists that the user joins or creates from its own database according to the user ID included in the obtaining request from the micro-blog terminal, and generating a micro-blog list ID roster accordingly, which micro-blog list ID roster includes at least one micro-blog list. The micro-blog list server of the micro-blog server obtains from its own database the general information of the micro-blog lists corresponding to each micro-blog list ID according to the user's micro-blog list ID roster, and feeds back to the micro-blog list management module the user's micro-blog list ID roster and the general information of the micro-blog lists corresponding to each micro-blog list ID.

The micro-blog list management module receives from the micro-blog list server the user's micro-blog list ID roster and the general information of the micro-blog lists corresponding to each micro-blog list ID, and generates the user's list roster which includes at least one micro-blog list according to the user's micro-blog list ID roster and the general information of the micro-blog list corresponding to each micro-blog list ID that are fed back from the micro-blog list server, and displays the user's list roster in the displaying interface.

The micro-blog list management module timely packages the micro-blog list ID roster of the user's micro-blog list roster, and generates an unread lookup request to be sent to the micro-blog server for looking up the unread messages of each micro-blog list included in the list roster. The micro-blog list server determines whether the members of the micro-blog list corresponding to the micro-blog list ID have posted new messages between the last unread lookup request and the current unread lookup request, according to the micro-blog list ID roster contained in the unread lookup request. If there finds the new posted messages, the micro-blog list server sets an unread sign on the micro-blog list ID of which the user that posted the new message is the member, and a micro-blog list ID roster with unread signs are sent back to the micro-blog list management module. The micro-blog list management module receives and iterates the ID lists with unread signs that are fed back from the micro-blog server, and displays in the user's list roster the corresponding unread sign.

When the user chooses any one of the micro-blog list from the list roster, the micro-blog terminal writes the name of the chosen micro-blog list into a new displaying page, and packages the chosen micro-blog list IDs to generate a message list request to be sent to the micro-blog server for requesting to obtain the message list of the chosen micro-blog list. The micro-blog list server looks up from its own database the member ID list according to the chosen micro-blog list ID included in the message list request. The micro-blog indexing server of the micro-blog server obtains from its own database the message indexing ID list of the members in the chosen micro-blog list according to the looked up member ID list of the chosen micro-blog list. The micro-blog indexing server iterates the message indexing ID list of the members of the chosen micro-blog list, ranks all the message indexing IDs in light of the timeline, to generate a messaging indexing ID list of the chosen micro-blog list, and feeds back the messaging indexing ID list of the chosen micro-blog list to the micro-blog message management module.

The micro-blog message management module packages the message indexing ID list of the chosen micro-blog list that is fed back from the micro-blog indexing server, to generate a message body obtaining request to be sent to the micro-blog server for obtaining the message body corresponding to the message indexing ID list of the chosen micro-blog list. The micro-blog message server of the micro-blog server draws the message bodies corresponding to the message indexing IDs in the messaging indexing ID list of the chosen micro-blog list according to the message indexing ID list of the chosen micro-blog list contained in the message body obtaining request sent from the micro-blog terminal; and feeds back the message bodies corresponding to the message indexing IDs in the message indexing ID list to the micro-blog terminal.

The micro-blog message management module receives the message indexing ID list and message bodies corresponding to each message indexing ID in the message indexing ID list that are fed back from the micro-blog message server, and generates a message list for the chosen micro-blog list. The micro-blog message management module sequentially displays the message list of the chosen micro-blog list in the new message displaying page with the name of the chosen micro-blog list.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page. Meanwhile, the current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

Those skilled in the art could understand that the whole or part of the flows included in the method of the above embodiments could be accomplished by relative hardware under instruction of computer programs. The programs could be stored in computer readable storage medium. When executing the program, it would be included the flows as in the methods of the above embodiments. Wherein, the storage medium could be magnetic disks, optical disks, read-only memories, or random access memories, etc.

It is provided according to the current disclosure one or more storage medium that include executable program thereon. The executable program is used for carry out a method for displaying micro-blog messages. The method includes: when detected the user's lookup operation on the micro-blog list, the micro-blog terminal corresponding to the user sends an obtaining request to the micro-blog server for obtaining the list roster of the user; the micro-blog terminal receives and displays the list roster of the user that is fed back by the micro-blog server; the list roster includes at least one micro-blog list; when any one of the micro-blog list is selected by the user from the list roster, the micro-blog terminal writes the name of the chosen micro-blog list into a new displaying page, and sends a message list request to the micro-blog server for obtaining the message list of the chosen micro-blog list; the micro-blog terminal receives the message list of the chosen micro-blog list that is fed back from the micro-blog server, and displays in the new message displaying page with the name of the chosen micro-blog list the message list of the chosen micro-blog list.

In accordance with an exemplary embodiment, when detected the user's lookup operation on the micro-blog list, the micro-blog terminal corresponding to the user sends an obtaining request to the micro-blog server for obtaining the list roster of the user, which includes: when detected the user's lookup operation on the micro-blog list, the micro-blog terminal corresponding to the user packages the user's ID, and accordingly generates the obtaining request; the micro-blog terminal sends the obtaining request to the micro-blog server, for obtaining the list roster of the user.

In accordance with another exemplary embodiment, after the micro-blog terminal sends the obtaining request to the micro-blog server, and before the micro-blog terminal receives and displays the list roster of the user that is fed back by the micro-blog server, it is included that: the micro-blog server looks up the micro-blog list IDs of the micro-blog lists that the user joins or creates from a database according to the user ID included in the obtaining request from the micro-blog terminal, and generating a micro-blog list ID roster accordingly, which micro-blog list ID roster includes at least one micro-blog list; the micro-blog server obtains from a database the general information of the micro-blog lists corresponding to each micro-blog list ID according to the user's micro-blog list ID roster, and feeds back to the micro-blog terminal the user's micro-blog list ID roster and the general information of the micro-blog lists corresponding to each micro-blog list ID; wherein the general information of the micro-blog list includes but not limited to: micro-blog list ID and its member ID list, name of the micro-blog list, brief introduction of the micro-blog list, type of the micro-blog list, and one or more of the attributes of the micro-blog list.

According to one of the embodiments, the micro-blog terminal receives and displays the list roster of the user that is fed back by the micro-blog server, which includes: the micro-blog terminal receives from the micro-blog server the user's micro-blog list ID roster and the general information of the micro-blog lists corresponding to each micro-blog list ID, and generates the user's list roster which includes at least one micro-blog list according to the user's micro-blog list ID roster and the general information of the micro-blog list corresponding to each micro-blog list ID that are fed back from the micro-blog list server, and displays the user's list roster in the displaying interface.

According to one of the embodiments, the micro-blog terminal sends a message list request to the micro-blog server for obtaining the message list of the chosen micro-blog list; which includes: the micro-blog terminal packages the chosen micro-blog list IDs to generate a message list request to be sent to the micro-blog server for requesting to obtain the message list of the chosen micro-blog list.

According to an exemplary embodiment, after the micro-blog terminal sends a message list request to the micro-blog server, and before the micro-blog terminal receives the message list of the chosen micro-blog list that is fed back from the micro-blog server, it is includes that: the micro-blog server looks up from a database the member ID list according to the chosen micro-blog list ID included in the message list request; the micro-blog server obtains the message indexing ID list of the members in the chosen micro-blog list according to the looked up member ID list of the chosen micro-blog list; the micro-blog server iterates the message indexing ID list of the members of the chosen micro-blog list, ranks all the message indexing IDs in light of the timeline, to generate a messaging indexing ID list of the chosen micro-blog list, and feeds back the messaging indexing ID list of the chosen micro-blog list to the micro-blog terminal; the micro-blog terminal packages the message indexing ID list of the chosen micro-blog list that is fed back from the micro-blog server, to generate a message body obtaining request to be sent to the micro-blog server for obtaining the message body corresponding to the message indexing ID list of the chosen micro-blog list; the micro-blog server draws the message bodies corresponding to the message indexing IDs in the messaging indexing ID list of the chosen micro-blog list according to the message indexing ID list of the chosen micro-blog list contained in the message body obtaining request sent from the micro-blog terminal; and feeds back the message bodies corresponding to the message indexing IDs in the message indexing ID list to the micro-blog terminal.

According to one of the embodiments, the micro-blog terminal receives the message list of the chosen micro-blog list that is fed back from the micro-blog server, and displays in the new message displaying page with the name of the chosen micro-blog list the message list of the chosen micro-blog list, which includes: the micro-blog terminal receives the message indexing ID list and message bodies corresponding to each message indexing ID in the message indexing ID list that are fed back from the micro-blog server, and generates a message list for the chosen micro-blog list according to the message indexing ID list and message bodies corresponding to each message indexing ID in the message indexing ID list; the micro-blog terminal displays the message list of the chosen micro-blog list in the new message displaying page with the name of the chosen micro-blog list.

In accordance with an exemplary embodiment, after the micro-blog terminal receives and displays the list roster of the user that is fed back by the micro-blog server, it is included that: the micro-blog terminal timely sends an unread lookup request to the micro-blog server, for looking up the unread messages of each micro-blog list included in the list roster; which includes: the micro-blog terminal packages the micro-blog list ID roster of the user's micro-blog list roster, and generates an unread lookup request; the micro-blog terminal sends the unread lookup request to the micro-blog server for looking up the unread messages of each micro-blog list included in the list roster.

According to an embodiment, after the micro-blog terminal sends the unread lookup request to the micro-blog server, it is included that: the micro-blog server determines whether the members of the micro-blog list corresponding to the micro-blog list ID have posted new messages between the last unread lookup request and the current unread lookup request, according to the micro-blog list ID roster contained in the unread lookup request; if there finds the new posted messages, the micro-blog server sets an unread sign on the micro-blog list ID of which the user that posted the new message is the member, and a micro-blog list ID roster with unread signs are sent back to the micro-blog terminal, the micro-blog terminal receives and iterates the ID lists with unread signs that are fed back from the micro-blog server, and displays in the user's list roster the corresponding unread sign.

The above described embodiments explains only several exemplary embodiments of the present disclosure while shall not be understood as to limit the invention to the precise forms disclosed. It shall be mentioned that for those skilled in the art, alternative embodiments could be made to which the present disclosure pertains without departing from its spirit and scope. Accordingly, the scope of the present disclosure is defined by the appended claims rather than the foregoing description and the exemplary embodiments described therein.

What is claimed is:

1. A method for displaying micro-blog messages, comprising:
   when detected a user's lookup operation on a micro-blog list, a micro-blog terminal corresponding to the user sending an obtaining request to a micro-blog server for obtaining a list roster of the user;
   the micro-blog terminal receiving and displaying the list roster of the user that is fed back by the micro-blog server; the list roster comprising at least one micro-blog list;
   when any one of the micro-blog list is selected from the list roster, the micro-blog terminal writing a name of the chosen micro-blog list into a new displaying page, and sending a message list request to the micro-blog server for obtaining the message list of the chosen micro-blog list; and
   the micro-blog terminal receiving the message list of the chosen micro-blog list that is fed back from the micro-blog server, and displaying the message list of the chosen micro-blog list on the new message displaying page with the name of the chosen micro-blog list,
wherein when detected the user's lookup operation on the micro-blog list, the micro-blog terminal corresponding to the user sending an obtaining request to the micro-blog server for obtaining the list roster of the user comprises:
   when detected the user's lookup operation on the micro-blog list, the micro-blog terminal corresponding to the user packaging the user's ID, and accordingly generating the obtaining request;
   the micro-blog terminal sending the obtaining request to the micro-blog server, for obtaining the list roster of the user.

2. The method for displaying micro-blog messages according to claim 1, wherein after the micro-blog terminal sending the obtaining request to the micro-blog server, and before the micro-blog terminal receiving and displaying the list roster of the user that is fed back by the micro-blog server, further comprises:
   the micro-blog server looking up micro-blog list IDs of the micro-blog lists that the user joins or creates from a database according to the user ID comprised in the obtaining request from the micro-blog terminal, and generating a micro-blog list ID roster accordingly, which micro-blog list ID roster comprises at least one micro-blog list;
   the micro-blog server obtaining from a database general information of the micro-blog lists corresponding to each micro-blog list ID according to the user's micro-blog list ID roster; and
   the micro-blog server feeding back to the micro-blog terminal the user's micro-blog list ID roster and the general information of the micro-blog lists corresponding to each micro-blog list ID; wherein
   the general information of the micro-blog list comprises: micro-blog list ID and its member ID list, name of the micro-blog list, brief introduction of the micro-blog list, type of the micro-blog list, and one or more of attributes of the micro-blog list.

3. The method for displaying micro-blog messages according to claim 2, wherein the micro-blog terminal receiving and displaying the list roster of the user that is fed back by the micro-blog server comprises:
   the micro-blog terminal receiving from the micro-blog server the user's micro-blog list ID roster and the general information of the micro-blog lists corresponding to each micro-blog list ID;
   the micro-blog terminal generating the user's list roster which comprises at least one micro-blog list according to the user's micro-blog list ID roster and the general information of the micro-blog list corresponding to each micro-blog list ID that are fed back from the micro-blog list server;
   the micro-blog terminal displaying the user's list roster in a displaying interface.

4. The method for displaying micro-blog messages according to claim 3, wherein the micro-blog terminal sending a message list request to the micro-blog server for obtaining the message list of the chosen micro-blog list comprises:
   the micro-blog terminal packaging the chosen micro-blog list IDs to generate a message list request; and
   the micro-blog terminal sending the message list request to the micro-blog server for requesting to obtain the message list of the chosen micro-blog list.

5. The method for displaying micro-blog messages according to claim 4, wherein after the micro-blog terminal sending a message list request to the micro-blog server, and before the micro-blog terminal receiving the message list of the chosen micro-blog list that is fed back from the micro-blog server, further comprises:
   the micro-blog server looking up from a database the member ID list according to the chosen micro-blog list ID comprised in the message list request;
   the micro-blog server obtaining the message indexing ID list of the members in the chosen micro-blog list according to the looked up member ID list of the chosen micro-blog list;
   the micro-blog server iterating the message indexing ID list of the members of the chosen micro-blog list, ranking all the message indexing IDs in light of the timeline, to generate a messaging indexing ID list of the chosen micro-blog list;
   the micro-blog server feeding back the messaging indexing ID list of the chosen micro-blog list to the micro-blog terminal;

the micro-blog terminal packaging the message indexing ID list of the chosen micro-blog list that is fed back from the micro-blog server, to generate a message body obtaining request to be sent to the micro-blog server for obtaining the message body corresponding to the message indexing ID list of the chosen micro-blog list; and the micro-blog server drawing the message bodies corresponding to the message indexing IDs in the messaging indexing ID list of the chosen micro-blog list according to the message indexing ID list of the chosen micro-blog list contained in the message body obtaining request sent from the micro-blog terminal; and feeding back the message bodies corresponding to the message indexing IDs in the message indexing ID list to the micro-blog terminal.

6. The method for displaying micro-blog messages according to claim 5, wherein the micro-blog terminal receiving the message list of the chosen micro-blog list that is fed back from the micro-blog server, and displaying the message list of the chosen micro-blog list on the new message displaying page with the name of the chosen micro-blog list comprises:

the micro-blog terminal receiving the message indexing ID list and message bodies corresponding to each message indexing ID in the message indexing ID list that are fed back from the micro-blog server;

the micro-blog terminal generating a message list for the chosen micro-blog list according to the message indexing ID list and message bodies corresponding to each message indexing ID in the message indexing ID list; and the micro-blog terminal displaying the message list of the chosen micro-blog list on the new message displaying page with the name of the chosen micro-blog list.

7. The method for displaying micro-blog messages according to claim 1, wherein after the micro-blog terminal receiving and displaying the list roster of the user that is fed back by the micro-blog server, further comprises:

the micro-blog terminal timely sending an unread lookup request to the micro-blog server, for looking up the unread messages of each micro-blog list comprised in the list roster; which comprises:

the micro-blog terminal packaging the micro-blog list ID roster of the user's micro-blog list roster, and generating an unread lookup request; and the micro-blog terminal sending the unread lookup request to the micro-blog server for looking up the unread messages of each micro-blog list comprised in the list roster.

8. The method for displaying micro-blog messages according to claim 7, wherein after the micro-blog terminal sending the unread lookup request to the micro-blog server, further comprises:

the micro-blog server determining whether the members of the micro-blog list corresponding to the micro-blog list ID have posted new messages between the last unread lookup request and the current unread lookup request, according to the micro-blog list ID roster contained in the unread lookup request;

if there finds the new posted messages, the micro-blog server setting an unread sign on the micro-blog list ID of which the user that posted the new message is the member, and a micro-blog list ID roster with unread signs are sent back to the micro-blog terminal; and the micro-blog terminal iterating the ID lists with unread signs that are fed back from the micro-blog server, and displaying in the user's list roster the corresponding unread sign.

9. One or more non-transitory storage medium that comprising executable program, which program being used for executing a method for displaying micro-blog messages, wherein the method comprises:

when detected a user's lookup operation on a micro-blog list, a micro-blog terminal corresponding to the user sending an obtaining request to a micro-blog server for obtaining a list roster of the user;

the micro-blog terminal receiving and displaying the list roster of the user that is fed back by the micro-blog server; the list roster comprising at least one micro-blog list;

when any one of the micro-blog list is selected from the list roster, the micro-blog terminal writing a name of the chosen micro-blog list into a new displaying page, and sending a message list request to the micro-blog server for obtaining the message list of the chosen micro-blog list; and the micro-blog terminal receiving the message list of the chosen micro-blog list that is fed back from the micro-blog server, and displaying the message list of the chosen micro-blog list on the new message displaying page with the name of the chosen micro-blog list, wherein when detected the user's lookup operation on the micro-blog list, the micro-blog terminal corresponding to the user sending an obtaining request to the micro-blog server for obtaining the list roster of the user comprises:

when detected the user's lookup operation on the micro-blog list, the micro-blog terminal corresponding to the user packaging the user's ID, and accordingly generating the obtaining request; and the micro-blog terminal sending the obtaining request to the micro-blog server, for obtaining the list roster of the user.

10. The non-transitory storage medium according to claim 9, wherein after the micro-blog terminal sending the obtaining request to the micro-blog server, and before the micro-blog terminal receiving and displaying the list roster of the user that is fed back by the micro-blog server, further comprises:

the micro-blog server looking up micro-blog list IDs of the micro-blog lists that the user joins or creates from a database according to the user ID comprised in the obtaining request from the micro-blog terminal, and generating a micro-blog list ID roster accordingly, which micro-blog list ID roster comprises at least one micro-blog list;

the micro-blog server obtaining from a database the general information of the micro-blog lists corresponding to each micro-blog list ID according to the user's micro-blog list ID roster; and the micro-blog server feeding back to the micro-blog terminal the user's micro-blog list ID roster and the general information of the micro-blog lists corresponding to each micro-blog list ID; wherein the general information of the micro-blog list comprises: micro-blog list ID and its member ID list, name of the micro-blog list, brief introduction of the micro-blog list, type of the micro-blog list, and one or more of the attributes of the micro-blog list.

11. The non-transitory storage medium according to claim 10, wherein the micro-blog terminal receiving and displaying the list roster of the user that is fed back by the micro-blog server comprises:

the micro-blog terminal receiving from the micro-blog server the user's micro-blog list ID roster and the general information of the micro-blog lists corresponding to each micro-blog list ID;

the micro-blog terminal generating the user's list roster which comprises at least one micro-blog list according to the user's micro-blog list ID roster and the general information of the micro-blog list corresponding to each micro-blog list ID that are fed back from the micro-blog list server; and the micro-blog terminal displaying the user's list roster in a displaying interface.

12. The non-transitory storage medium according to claim 11, wherein the micro-blog terminal sending a message list request to the micro-blog server for obtaining the message list of the chosen micro-blog list comprises:

the micro-blog terminal packaging the chosen micro-blog list IDs to generate a message list request; and the micro-blog terminal sending the message list request to the micro-blog server for requesting to obtain the message list of the chosen micro-blog list.

13. The non-transitory storage medium according to claim 12, wherein after the micro-blog terminal sending a message list request to the micro-blog server, and before the micro-blog terminal receiving the message list of the chosen micro-blog list that is fed back from the micro-blog server, further comprises:

the micro-blog server looking up from a database the member ID list according to the chosen micro-blog list ID comprised in the message list request;

the micro-blog server obtaining the message indexing ID list of the members in the chosen micro-blog list according to the looked up member ID list of the chosen micro-blog list;

the micro-blog server iterating the message indexing ID list of the members of the chosen micro-blog list, ranking all the message indexing IDs in light of the timeline, to generate a messaging indexing ID list of the chosen micro-blog list;

the micro-blog server feeding back the messaging indexing ID list of the chosen micro-blog list to the micro-blog terminal;

the micro-blog terminal packaging the message indexing ID list of the chosen micro-blog list that is fed back from the micro-blog server, to generate a message body obtaining request to be sent to the micro-blog server for obtaining the message body corresponding to the message indexing ID list of the chosen micro-blog list; and the micro-blog server drawing the message bodies corresponding to the message indexing IDs in the messaging indexing ID list of the chosen micro-blog list according to the message indexing ID list of the chosen micro-blog list contained in the message body obtaining request sent from the micro-blog terminal; and feeding back the message bodies corresponding to the message indexing IDs in the message indexing ID list to the micro-blog terminal.

14. The non-transitory storage medium according to claim 13, wherein the micro-blog terminal receiving the message list of the chosen micro-blog list that is fed back from the micro-blog server, and displaying the message list of the chosen micro-blog list on the new message displaying page with the name of the chosen micro-blog list comprises:

the micro-blog terminal receiving the message indexing ID list and message bodies corresponding to each message indexing ID in the message indexing ID list that are fed back from the micro-blog server;

the micro-blog terminal generating a message list for the chosen micro-blog list according to the message indexing ID list and message bodies corresponding to each message indexing ID in the message indexing ID list; and the micro-blog terminal displaying the message list of the chosen micro-blog list on the new message displaying page with the name of the chosen micro-blog list.

15. The non-transitory storage medium according to claim 9, wherein after the micro-blog terminal receiving and displaying the list roster of the user that is fed back by the micro-blog server, further comprises:

the micro-blog terminal timely sending an unread lookup request to the micro-blog server, for looking up the unread messages of each micro-blog list comprised in the list roster; which comprises:

the micro-blog terminal packaging the micro-blog list ID roster of the user's micro-blog list roster, and generating an unread lookup request; and the micro-blog terminal sending the unread lookup request to the micro-blog server for looking up the unread messages of each micro-blog list comprised in the list roster.

16. The non-transitory storage medium according to claim 15, wherein after the micro-blog terminal sending the unread lookup request to the micro-blog server, further comprises:

the micro-blog server determining whether the members of the micro-blog list corresponding to the micro-blog list ID have posted new messages between the last unread lookup request and the current unread lookup request, according to the micro-blog list ID roster contained in the unread lookup request;

if there finds the new posted messages, the micro-blog server setting an unread sign on the micro-blog list ID of which the user that posted the new message is the member, and a micro-blog list ID roster with unread signs are sent back to the micro-blog terminal; and the micro-blog terminal iterating the ID lists with unread signs that are fed back from the micro-blog server, and displaying in the user's list roster the corresponding unread sign.

* * * * *